United States Patent
Yamazaki et al.

[11] Patent Number: 5,283,634
[45] Date of Patent: Feb. 1, 1994

[54] LUMINANCE SIGNAL CORRECTING METHOD

[75] Inventors: Yasuyuki Yamazaki; Tsutomu Takayama, both of Kanagawa, Japan

[73] Assignee: Canon Kabushiki Kaisha, Tokyo, Japan

[21] Appl. No.: 814,238

[22] Filed: Dec. 23, 1991

Related U.S. Application Data

[63] Continuation of Ser. No. 533,935, Jun. 5, 1990, abandoned, which is a continuation of Ser. No. 206,581, Jun. 14, 1988, abandoned.

[30] Foreign Application Priority Data

Jun. 18, 1987 [JP] Japan .................. 62-150262
Aug. 6, 1987 [JP] Japan .................. 62-195283

[51] Int. Cl.$^5$ .................. H04N 9/77; H04N 9/78
[52] U.S. Cl. .................. 348/234; 348/254; 348/675
[58] Field of Search .................. 358/27, 41, 43, 44, 358/48, 39, 37, 31, 16, 32, 42, 52; H04N 9/77, 9/78

[56] References Cited

U.S. PATENT DOCUMENTS

| | | | |
|---|---|---|---|
| 2,916,544 | 12/1959 | Gibson et al. | 358/32 |
| 4,415,923 | 11/1983 | Noda | 358/39 |
| 4,553,157 | 11/1985 | Hurst, Jr. | 358/37 |
| 4,559,554 | 12/1985 | Nitta | 358/39 |
| 4,751,567 | 6/1988 | Hashimoto | 358/44 |
| 4,805,011 | 2/1989 | Sase | 358/39 |
| 4,833,527 | 5/1989 | Kondo | 358/39 |
| 4,954,881 | 9/1990 | Kave | 358/27 |

FOREIGN PATENT DOCUMENTS

| | | | |
|---|---|---|---|
| 0201395 | 12/1982 | Japan | 358/43 |
| 0195390 | 11/1983 | Japan | H04N 9/07 |
| 0182892 | 9/1985 | Japan | 358/48 |
| 0254895 | 12/1985 | Japan | 358/41 |

*Primary Examiner*—Edward L. Coles, Sr.
*Assistant Examiner*—Jerome Grant, II
*Attorney, Agent, or Firm*—Robin, Blecker, Daley & Driscoll

[57] ABSTRACT

In a method for correcting a luminance signal of a single-plate type color camera which is arranged to read out signals for three primary colors, red (R), green (G) and blue (B), by using a solid-state image sensor and to separate and take out the luminance signal and color difference signals, a correction circuit is used for correcting the luminance signal with a correction signal which is formed from the color difference signals, and the correction signal is formed by selecting one of the color difference signals which has the largest value among the color difference signals.

21 Claims, 9 Drawing Sheets

LUMINANCE SIGNAL CORRECTING METHOD

This is a continuation application under 37 CFR 1.62 of prior application Ser. No. 533,935, filed Jun. 5, 1990 now abandoned, which is a continuation of application Ser. No. 206,581, filed Jun. 14, 1988, now abandoned.

BACKGROUND OF THE INVENTION

1. Field of the Invention

This invention relates to a luminance signal correcting method for a single-plate type color camera having a solid-state image sensor.

2. Description of the Related Art

FIG. 1(a) of the accompanying drawings is a block diagram showing by way of example the arrangement of the conventional signal-plate type color camera using a solid-state image sensor. FIG. 1(b) shows an example of color filter. Referring to these drawings, the solid-state image sensor 1 is, for example, a CCD. The filter is a striped-color separating filter as shown in FIG. 1(b) and is disposed in front of the image sensor 1. The image sensor 1 is thus arranged to produce signals for three primary colors, i.e., red (R), green (G) and blue (B). Sample-and-hold (S/H) circuits 2, 2a and 2b are arranged to sample and hold these three outputs of the image sensor 1 respectively at a timing which is as shown in FIG. 1(c). Reference numerals 3, 3a and 3b denote amplifiers. Clamp circuits 4, 4a and 4b are arranged to fix (clamp) a black level at a given potential. The camera further includes a gate circuit 5, low-pass filters (LPFs) 6, 6a, 6b and 6c; $\gamma$ correction circuits 7, 7a, 7b and 7c; a horizontal driving circuit 8; a vertical driving circuit 9; a timing generating circuit 10; an addition circuit 12; and subtraction circuits 13 and 14.

Color signals for the three primary colors R, G and B which are produced from the image sensor 1 and have their black levels clamped by the clamp circuits 4, 4a and 4b are supplied to the gate circuit 5. The gate circuit 5 is arranged to have gate pulses applied thereto by the timing generating circuit 10 as shown in FIG. 1(c) in accordance with the arrangement of the color filter provided at the image sensor 1. These gate pulses cause switches SW-R, SW-G and SW-B included in the gate circuit 5 to close in sequence to gate the color signals R, G and B by turns. A luminance signal $Y_1$ of a high frequency band is formed by this gating action.

Meanwhile, the three primary color signals R, G and B are supplied to the LPFs 6, 6a and 6b to have their bands limited and are thus converted into color signals $R_L$, $G_L$ and $B_L$. The signals $R_L$, $G_L$ and $B_L$ are supplied to the $\gamma$ correction circuits 7, 7a and 7b, which are arranged to $\gamma$-correct them to be adjusted to the characteristic of a Braun tube in use. The $\gamma$-corrected color signals $R_L{}^\gamma$, $B_L{}^\gamma$ and $G_L{}^\gamma$ are added together by the addition circuit 12. The circuit 12 thus obtains a luminance signal $Y_L{}^\gamma$ of a low frequency band. The subtraction circuits 13 and 14 are arranged to form color difference signals $R_L{}^\gamma - Y_L{}^\gamma$ and $B_L{}^\gamma - Y_L{}^\gamma$ by subtracting the luminance signal $Y_L{}^\gamma$ from the color signals $R_L{}^\gamma$ and $B_L{}^\gamma$ respectively.

The luminance signal $Y_1$ has its band limited by the LPF 6c and is $\gamma$-corrected by the $\gamma$ correction circuit 7c and is produced from the circuit 7c as a luminance signal $Y_1{}^\gamma$.

In the case of a three-tube type color camera using a camera tube and a three-plate type color camera using a solid-state image sensor, a luminance signal Y is obtained by adding together the three primary color signals R, G and B in a ratio expressed by the following formula (1) for the purpose of adjusting the luminance signal Y to the spectral sensitivity of the human eye:

$$Y = 0.3\, R^\gamma + 0.59\, G^\gamma + 0.11\, B^\gamma \tag{1}$$

In the case of the conventional single-plate type color camera of the kind described above, however, the luminance signal Y is formed by serially gating the color signals R, G and B by means of the gate circuit 5 for the purpose of enhancing the resolution. Therefore, this process is equivalent to that when the luminance signal Y is obtained by adding together the three primary color signals R, G and B in the ratio of 1:1:1. This can be expressed as follows:

$$Y = 0.33\, R + 0.33\, G + 0.33\, B \tag{2}$$

With the luminance signal Y $\gamma$-corrected, Formula (2) above becomes as follows:

$$Y^\gamma = (0.33\, R + 0.33\, G + 0.33\, B)^\gamma \tag{3}$$

Further, the lower frequency band luminance signal component $Y_L{}^\gamma$ for forming the color difference signals is obtained by adding together the band-limited and $\gamma$-corrected color signal components $R_L{}^\gamma$, $G_L{}^\gamma$ and $B_L{}^\gamma$ in accordance with the following formula (4) in the same manner as in the case of Formula (1):

$$Y_L{}^\gamma = 0.3\, R_L{}^\gamma + 0.59\, G_L{}^\gamma + 0.11\, B_L{}^\gamma \tag{4}$$

In obtaining the original primary color signals R, G and B from the color difference signals $R_L{}^\gamma - Y_L{}^\gamma$ and $B_L{}^\gamma - Y_L{}^\gamma$ and the luminance signal $Y^\gamma$, the three-tube type and three-plate type color cameras are capable of reproducing colors with adequate fidelity as the luminance signal component $Y_L{}^\gamma$ (Formula (4)) which is included in the color difference signals is of the same value as the luminance signal component Y (Formula (1)). In the case of the single-plate type color camera of the kind described in the foregoing, however, it is impossible to reproduce colors with adequate fidelity as the value of the luminance signal component $Y_L{}^\gamma$ (Formula (4)) included in the color difference signals differs from that of the luminance signal $Y^\gamma$ (Formula (3)). In the case of a color such as red or blue that has a low illuminance signal level in Formula (1) in particular, the $\gamma$ correction brings each coefficient to a value 0.6 or thereabout and to a high signal level. As a result, the color becomes too bright when it is displayed by a monitor.

SUMMARY OF THE INVENTION

This invention is directed to the solution of the above stated problem of the prior art. It is therefore an object of the invention to provide a luminance signal correcting method for enabling a single-plate type color camera to have an adequate color reproducibility.

To attain this object, a single-phase type color camera having a solid-state image sensor is arranged according to this invention to add a correction signal which is obtained from color difference signals to the luminance signal. More specifically, in the single-plate type color camera arranged according to this invention to read out the three primary color (red, green and blue) signals R, G and B by means of the solid-state image sensor and to separate and take out the luminance signal and color difference signals from these signals R, G and B, the luminance signal is corrected by means of a correction signal which is obtained from the color difference signals.

The above stated embodiment of the invention is arranged to add to the luminance signal the correction signal obtained from the color difference signals and is capable of correcting the luminance signal to have primary color signal components thereof in a ratio which is adjusted to the spectral sensitivity of the human eyes.

Further, in a luminance signal correcting method provided to attain the above stated object according to this invention as another embodiment thereof, the luminance signal is corrected to have the three primary color signal components R, G and B included in the luminance signal in an adequately changed ratio by adding, to the luminance signal which is in a dot-sequential state, a correction signal formed from a signal containing the three primary color signal components.

The above stated correction method solves the problem of inadequate color reproducibility of the prior art by bringing the ratio of the red (R), green (G) and blue (B) signals of the illuminance signal close to the ratio of the luminance signal shown in the Formula (4).

The above and other objects and features of the invention will become apparent from the following detailed description of embodiments thereof taken in connection with the accompanying drawings.

DETAILED DESCRIPTION OF THE PREFERRED EMBODIMENTS

Figure 1A:
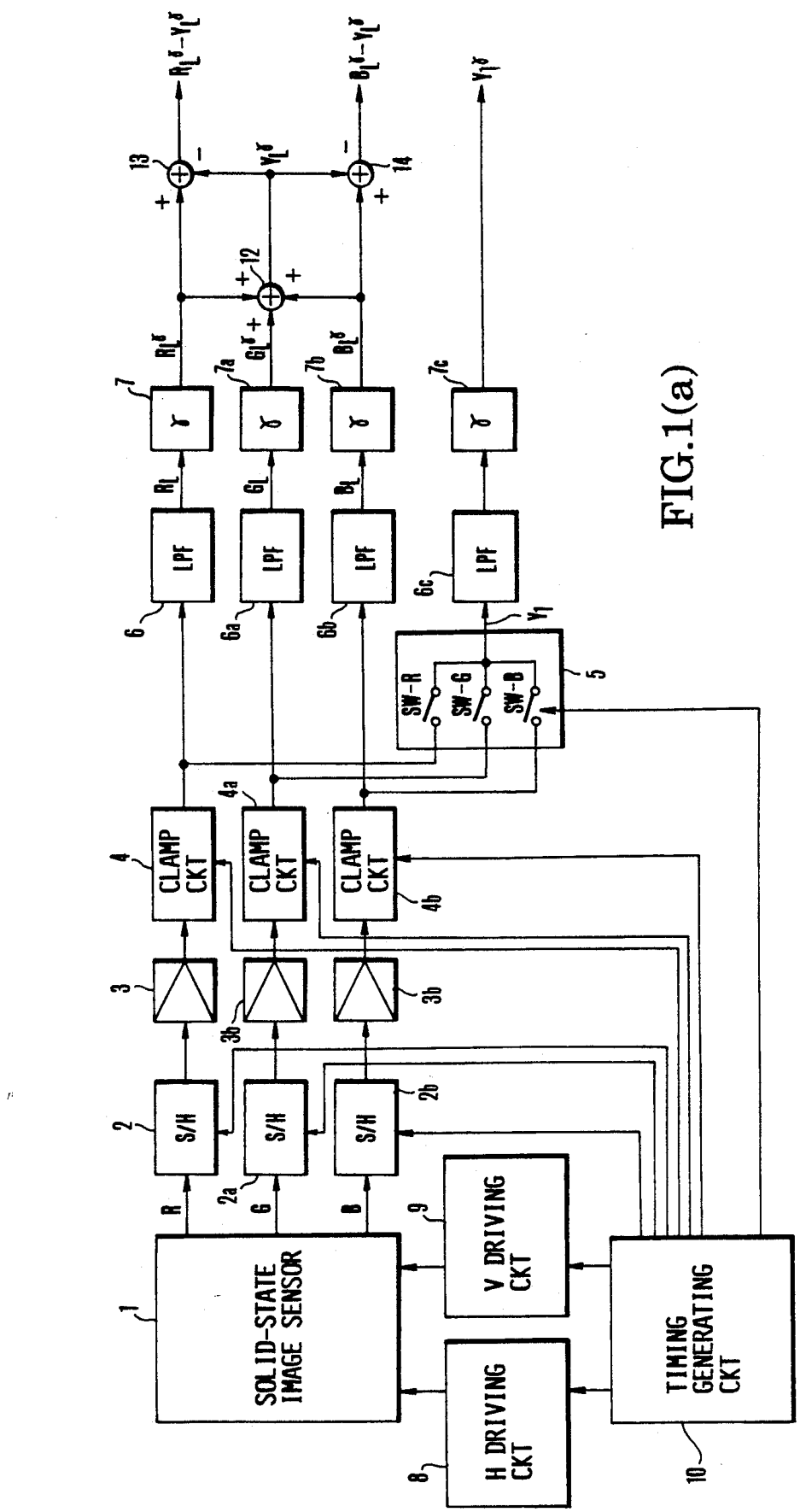
FIG. 1(a) is a block diagram showing by way of example the arrangement of the conventional color camera.
Figure 1B:
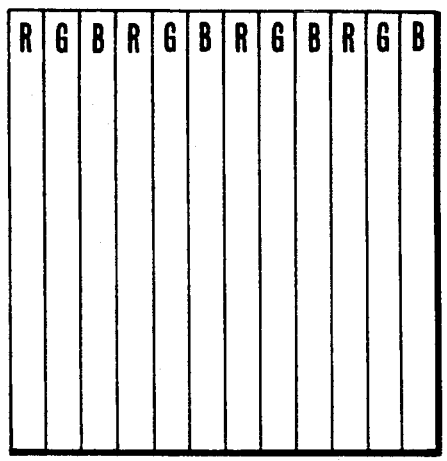
FIG. 1(b) shows by way of example a color separating filter.
Figure 1C:
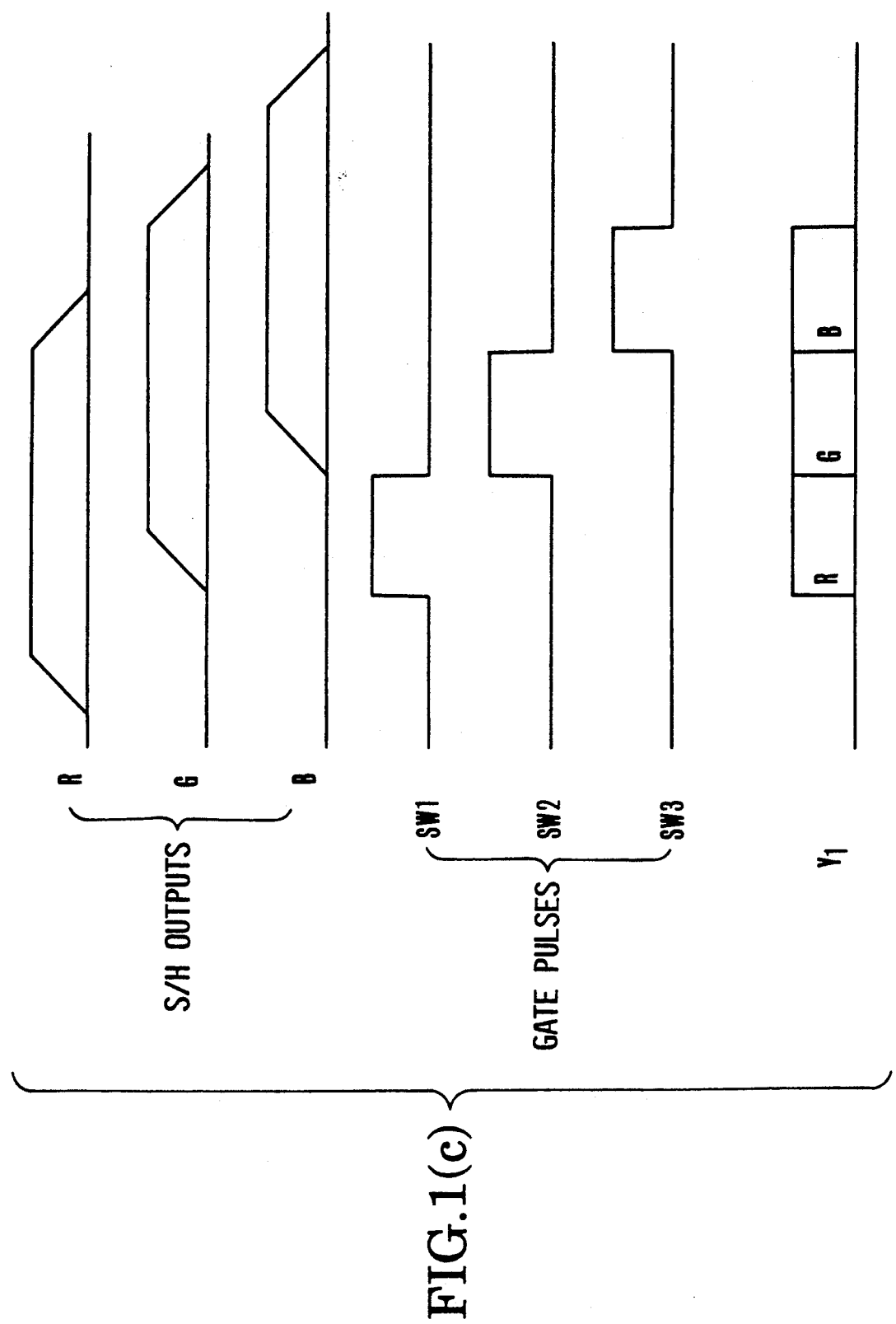
FIG. 1(c) is a timing chart showing the operation of the essential parts of FIG. 1(a).
Figure 2:
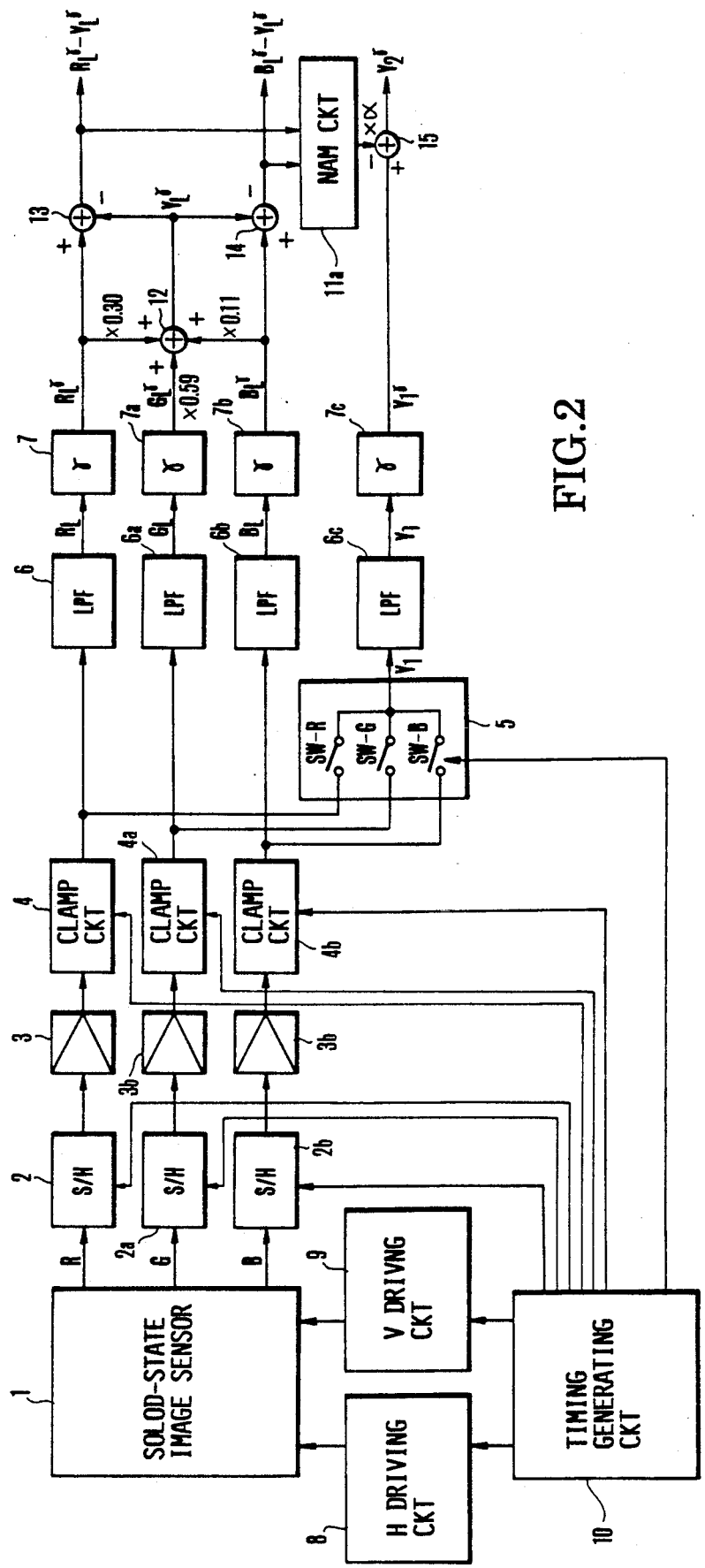
FIG. 2 is a block diagram showing the arrangement of a first embodiment of this invention.

Embodiments of this invention are described below with reference to the accompanying drawings:

FIG. 2 is a block diagram showing the arrangement of a first embodiment of the invention. In FIG. 2, the parts which are similar to the corresponding parts of FIG. 1(a) are indicated by the same reference numerals and symbols and the details of them are omitted from the following description. This embodiment is provided with a NAM (non-adder mixer) circuit 11a in addition to the arrangement of FIG. 1(a). The NAM circuit 11a is arranged to detect the peak levels of color difference signals supplied thereto. A reference numeral 15 denotes a subtraction circuit In the first embodiment, the luminance signal $Y_1^\gamma$ and the color difference signals $R_L^\gamma - Y_L^\gamma$ and $B_L^\gamma - Y_L^\gamma$ are obtained in the same manner as in the case of the conventional camera described in the foregoing. However, with the color difference signals $R_L^\gamma - Y_L^\gamma$ and $B_L^\gamma - Y_L^\gamma$ supplied to the NAM circuit 11a, one of them having a higher signal level than the other is selected by peak detection. The signal thus selected is multiplied by a given constant. The color difference signal thus multiplied is subtracted at the subtraction circuit 15 from the luminance signal $Y_1^\gamma$. A corrected luminance signal $Y_2^\gamma$ is thus produced.

Figure 3A:
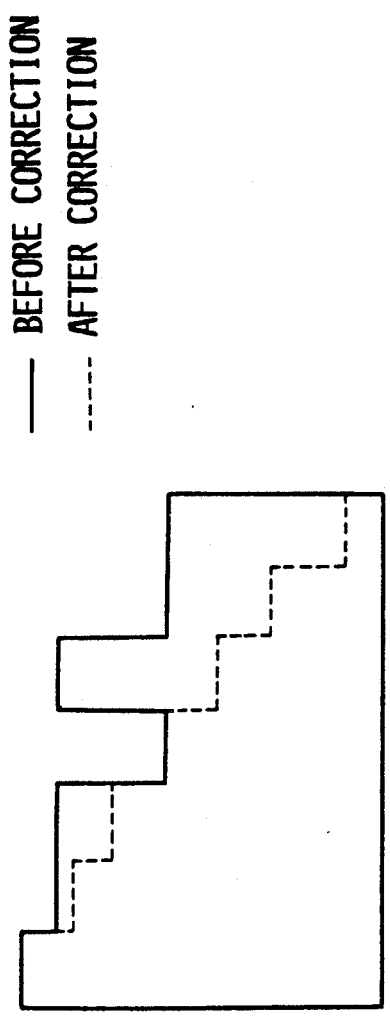
FIGS. 3(a) to 3(d) are wave form charts showing the operation of the first embodiment shown in FIG. 2.
Figure 3B:
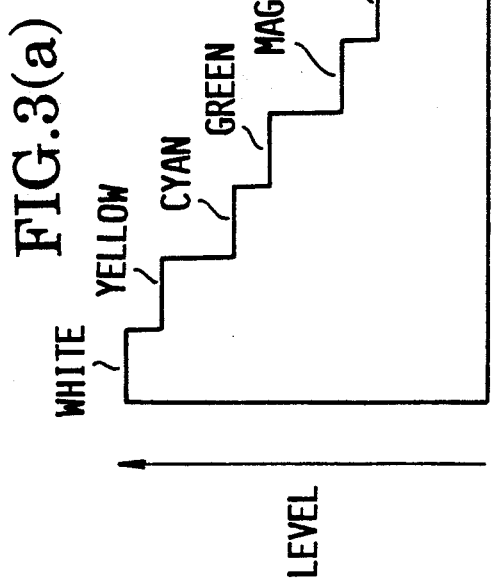
Figure 3C:
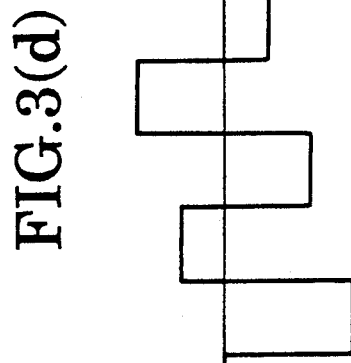
Figure 3D:
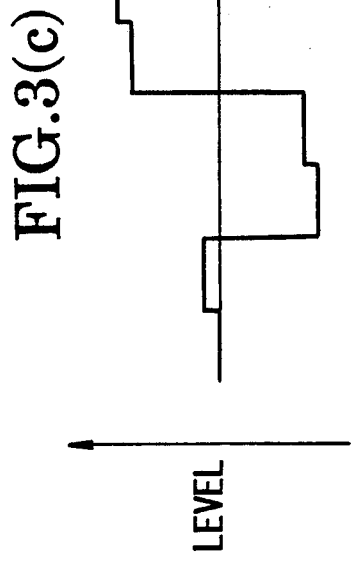

FIGS. 3(a) to 3(d) are wave form charts illustrating an image sensing operation of the first embodiment performed on a color bar chart. FIG. 3(a) shows the wave form of the luminance signal of Formula (1) obtained by a three-tube type color camera. FIG. 3(b) shows the wave form of the luminance signal of Formula (3) obtained by a single-plate type color camera. It is understood from comparison of the two that the level of the luminance signal indicated by a full line in FIG. 3(b) is higher as a whole. FIG. 3(c) shows the wave form of the color difference signal $R_L^\gamma - Y_L^\gamma$. FIG. 3(d) shows the wave form of the color difference signal $B_L^\gamma - Y_L^\gamma$.

With the color signals $R_L^\gamma - Y_L^\gamma$ and $B_L^\gamma - Y_L^\gamma$ applied to the NAM circuit 11a, the one having a higher signal level is selected. For example, in the case of FIGS. 3(a) to 3(d), the color difference signal $R_L^\gamma - Y_L^\gamma$ is selected at the red part of the color bar chart and the color difference signal $B_L^\gamma - Y_L^\gamma$ at the blue part. The color difference signal thus selected is multiplied by a given constant and is then subtracted at the subtraction circuit 15 from the luminance signal $Y_1^\gamma$ to change the ratio to each other of the three primary color signal components which are included in the luminance signal $Y_1^\gamma$. This process brings the wave form shown in FIG. 3(b) close to the wave form of FIG. 3(a) by correcting it into a wave form which is as indicated by the broken line of FIG. 3(b). Therefore, compared with the prior art arrangement described in the foregoing, the embodiment has a better color reproducibility on a color monitor.

Figure 4:
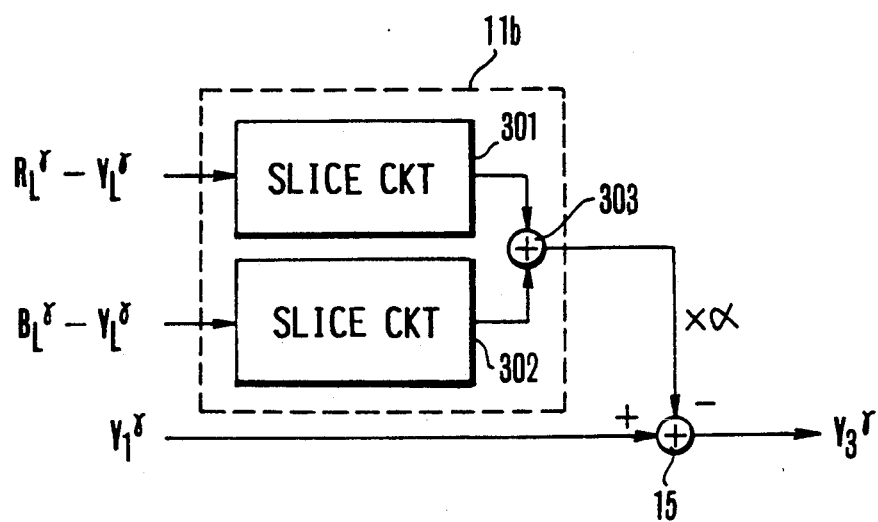
FIG. 4 is a block diagram showing the arrangement of a second embodiment of the invention.

FIG. 4 is a block diagram showing the arrangement of the essential parts of a second embodiment of the invention. A detection circuit 11b is comprised of slice circuits 301 and 302 and an addition circuit 303. In the case of the second embodiment, the NAM circuit 11a of FIG. 2 is replaced with the detection circuit 11b. The color difference signals $R_L^\gamma - Y_L^\gamma$ and $B_L^\gamma - Y_L^\gamma$ are sliced at a zero level respectively to take out positive signals alone by applying them to the slice circuits 301 and 302. The color difference signals thus processed are added together at the addition circuit 303. The output of the addition circuit 303 is multiplied by a certain constant ($\alpha$) and, after that, is subtracted from the luminance signal $Y_1^\gamma$ at the subtraction circuit 15. The circuit 15 thus produces a corrected luminance signal $Y_3^\gamma$. The same advantageous effect as that of the first embodiment shown in FIG. 2 is attainable through the above stated processes of the second embodiment.

As apparent from the foregoing description, a single-plate type color camera which is of the kind using a solid-state image sensor and is arranged according to this invention is capable of improving the color reproducibility with a very easy and simple arrangement, without lowering resolution, by correcting the luminance signal $Y_1^\gamma$ by means of a correction signal obtained from the color difference signals.

Figure 5:
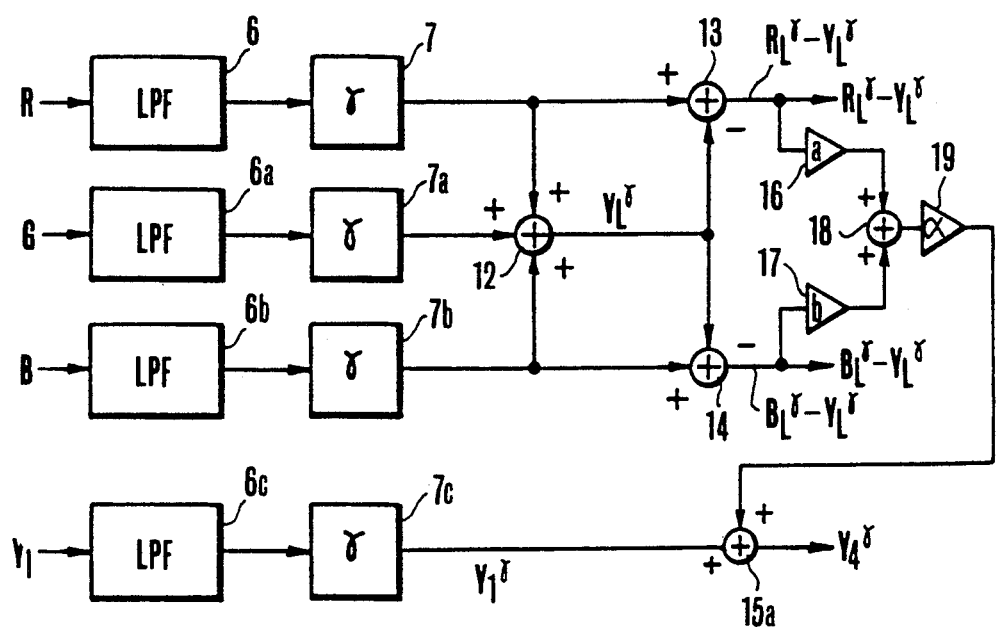
FIG. 5 is a block diagram showing the image sensing part of a single-plate type color camera which is arranged as a third embodiment of the invention.

FIG. 5 is a block diagram showing the image sensing part of a single-plate type color camera arranged according to this invention as a third embodiment thereof. The third embodiment is provided with amplifiers 16, 17 and 19. In FIG. 5, the same reference numerals and symbols are used as in FIGS. 1 to 4 in denoting the parts which are the same as or corresponding to those shown in FIGS. 1 to 4. Referring to FIG. 5, color difference signals $R_L^\gamma - Y_L^\gamma$ and $B_L^\gamma - Y_L^\gamma$ are supplied to the amplifiers 16 and 17 to be multiplied respectively by constants "a" and "b". The color difference signals thus multiplied is supplied to an adder 18 to be added together. The output of the adder 18 is supplied to the amplifier 19 to be further multiplied by a constant $\alpha$. The output of the amplifier 19 is supplied to an adder 15a to be added to the luminance signal $Y_1^\gamma$ to obtain a luminance signal $Y_4^\gamma$, which can be expressed as follows:

$$Y_4^\gamma = Y_L^\gamma + \alpha\{a (R_L^\gamma - Y_L^\gamma) + b (B_L^\gamma - Y_L^\gamma)\} \quad (5)$$

The ratio to each other of the color signal components R, G and B can be brought close to the ratio shown by Formula (4) by setting the coefficients a, b and $\alpha$ included in Formula (5) above at suitable values. Therefore, the third embodiment is capable of improving the reproducibility for some of the colors.

Figure 6:
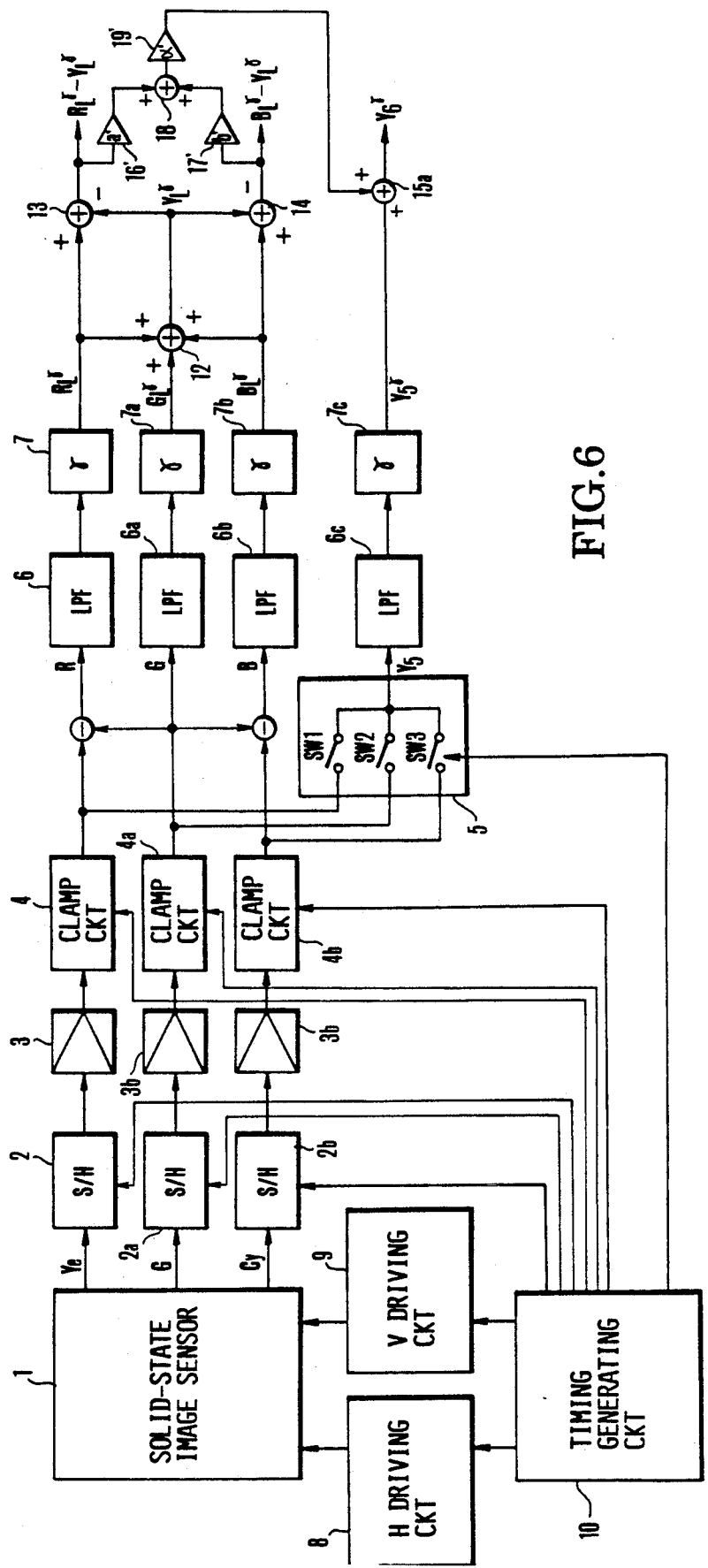
FIG. 6 is a block diagram showing a fourth embodiment of the invention.
Figure 7:
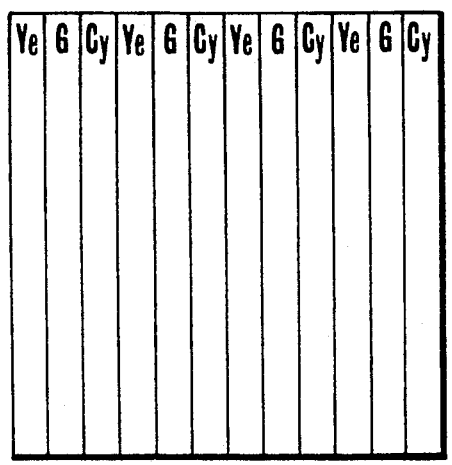
FIG. 7 shows a striped filter which consists of colors Ye, G and Cy and is attached to a solid-state image sensor shown in FIG. 6.

FIG. 6 shows in a block diagram a fourth embodiment of the invention. Referring to FIG. 6, a solid-state image sensor 1 is provided with a three-color striped filter consisting of Ye (yellow), G (green) and Cy (cyan) as shown in FIG. 7. Three color signals Ye, G and Cy are thus obtained through the filter and the image sensor 1. The fourth embodiment performs the same processes as those of the first embodiment shown in FIG. 2 to obtain a luminance signal $Y_5^\gamma$, which can be expressed as follows:

$$Y_5^\gamma = (0.2 R + 0.6 G + 0.2 B)^\gamma \quad (6)$$

This luminance value is corrected in the same manner as the third embodiment to obtain a corrected luminance signal $Y_6$, which can be expressed as follows:

$$Y_6^\gamma = Y_5^\gamma + \alpha'\{a' (R_L^\gamma - Y_L^\gamma) + b' (B_L^\gamma - Y_L^\gamma)\} \quad (7)$$

The same advantageous effect as those of the second and third embodiments can be obtained with the coefficients a', b' and $\alpha'$ set at suitable values.

Further, the same advantageous effect as those of the preceding embodiments is also attainable by carrying out adding and subtracting operations on the $\gamma$-corrected signals $R^\gamma$, $G^\gamma$ and $B^\gamma$ in a certain ratio to each other instead of forming from the color difference signals a signal to be used for correction. In that instance, the corrected luminance signal $Y_6^\gamma$ is expressed with Formula (4) substituted for Formula (7) as follows:

$$Y_6^\gamma = Y_5^\gamma + \alpha'(cR_l^\gamma + dG_L^\gamma + eB_L^\gamma)$$

wherein: $c = 0.7a' - 0.3b'$; $d = -0.59 (a' + b')$; and $e = -0.11a' + 0.89b'$.

In the case of the fourth embodiment, correction is carried out by using the Y-corrected signals. However, signals before $\gamma$ correction may be used for correction. Further, the striped filter of the three primary colors R, G and B or the striped filter of three colors Ye, G and Cy is employed in the embodiments described. However, it goes without saying that the arrangement and the color of the color filter are not limited to the above stated filter and any other filter is usable so far as the filter enables the camera to perform signal processing operations with three signals of R, G and B.

The single-plate type color camera which uses a solid-state image sensor and is arranged according to this invention as mentioned in the foregoing improves color reproducibility on a color monitor by virtue of its arrangement to add, to a dot-sequential luminance signal, a correction signal formed from a signal containing therein three primary color components in such a way as to change the ratio in which R, G and B color signals are contained in the dot-sequential luminance signal.

What is claimed is:

1. An apparatus for correcting a luminance signal of a single-plate type color camera which uses a solid-state image sensor in reading out signals for three colors and separates and takes out from these signals a gamma-corrected luminance signal and gamma-corrected color difference signals, comprising correcting means for correcting said gamma-corrected luminance signal with a correction signal which is obtained from said gamma-corrected color difference signals, wherein said correction signal is formed by selecting one of said gamma-corrected color difference signals which has a largest value among said gamma-corrected color difference signals.

2. An apparatus according to claim 1, wherein said correction signal is formed by adding together positive components of said gamma-corrected color difference signals.

3. A luminance signal correcting method wherein a gamma-corrected dot-sequential luminance signal is formed by a single solid-state image sensor in a dot-sequential state corresponding to a color separating filter disposed in front of said image sensor; a correction signal is formed by mixing a plurality of color-difference signals at a predetermined ratio; and the ratio to each other of three primary color signal components included in said gamma-corrected dot-sequential luminance signals for red, green and blue is changed by adding said correction signal to said gamma-corrected dot-sequential luminance signal.

4. An image sensing apparatus comprising:
   a) image sensing means for converting an optical image into an electrical signal and for separating a plurality of electrical color signals from said electrical signal and outputting said plurality of electrical color signals;
   b) high band luminance signal forming means for forming a luminance signal of a high frequency band by converting said plurality of electrical color signals output from said image sensing means into a dot-sequential state;
   c) gamma-correction means for applying gamma-correction to said high band luminance signal; and
   d) correcting means for correcting said gamma-corrected high band luminance signal on a basis of a signal formed by mixing a plurality of color-difference signals at a predetermined ratio.

5. An apparatus to claim 4, wherein said correcting means is arranged to correct said high band luminance signal of a basis of a plurality of gamma-corrected color difference signals formed from said plurality of electrical color signals.

6. An apparatus according to claim 5, wherein said correcting means is arranged to correct said gamma-corrected high band luminance signal on a basis of one of said plurality of gamma-corrected color difference signals which is within a given level range.

7. An image sensing apparatus comprising:
(a) image sensing means for converting an optical image into an electrical signal and for separating a plurality of electrical color signals from said electrical signal and outputting said plurality of electrical color signals;
(b) high band luminance signal forming means for forming a luminance signal of a high frequency band by converting said plurality of electrical color signals output from said image sensing means into a dot-sequential state;
(c) gamma-correction means for applying gamma-correction to said high band luminance signal; and
(d) correcting means for correcting said gamma-corrected high band luminance signal on a basis of one of a plurality of gamma-corrected color difference signals which is within a given level range, wherein said correcting means includes a NAM circuit which is arranged to receive said plurality of gamma-corrected color difference signals.

8. An apparatus according to claim 7, wherein said image sensing means includes a color separating filter which is disposed in front of said image sensing means.

9. An apparatus according to claim 7, wherein said high band luminance signal forming means includes gate means for selectively outputting said plurality of electrical color signals.

10. An apparatus according to claim 7, wherein said correcting means includes addition means for adding said plurality of gamma-corrected color signals to said gamma-corrected high band luminance signal.

11. An apparatus according to claim 7, wherein said correcting means includes arithmetic means for performing an arithmetic operation on said plurality of gamma-corrected color difference signals with said gamma-corrected high band luminance signal.

12. An image sensing apparatus for taking out a luminance component and a plurality of color-difference components from an output of a single image sensor means, comprising:
(a) correction signal forming means for forming a correction signal by mixing a plurality of color-difference signals at a predetermined ratio; and
(b) correcting means for correcting said luminance component on a basis of said correction signal.

13. An apparatus according to claim 12, wherein said at least one color component is selected in accordance with the respective levels of plurality of color components.

14. An apparatus according to claim 12, wherein said selected color component comprises one having the highest level.

15. An apparatus according to claim 12, wherein said correction signal is formed by adding together positive components of gamma-corrected color components.

16. An apparatus for correcting a luminance component, comprising:
(a) image sensor means for producing an electric signal from a light of an image of an object and for separating said electric signal into a luminance component and a plurality of color-difference components and outputting the separated components; and
(b) correcting means for correcting said luminance component on a basis of only one color-difference component selected from said plurality of color-difference components in each luminance component correction, said correcting means including a NAM circuit.

17. An apparatus according to claim 16, wherein said image sensor means includes a single-plate type color sensor.

18. An apparatus according to claim 16, wherein said correcting means includes a NAM circuit and an adder circuit for adding an output of the NAM circuit with said luminance component.

19. An apparatus according to claim 16, wherein said image sensor means includes a color separating filter disposed forwardly thereon.

20. An apparatus for correcting a luminance component for a color camera which takes out a luminance component and a plurality of color difference signals from a single image sensor means, comprising:
correcting signal producing means for producing a correcting signal on a basis of a mixed signal in which the plurality of color-difference signals are mixed together at a predetermined ratio other than a uniform ratio; and
correcting means for correcting said luminance component by said correcting signal.

21. An apparatus according to claim 20, wherein said correction signal is formed by mixing together positive components of said color components in a predetermined ratio.

* * * * *

UNITED STATES PATENT AND TRADEMARK OFFICE
CERTIFICATE OF CORRECTION

PATENT NO. : 5,283,634
DATED : Feburary 1, 1994
INVENTOR(S) : Yasuyuki Yamazaki; Tsutomu Takayama It is certified that error appears in the above-indentified patent and that said Letters Patent is hereby corrected as shown below:

Col. 1, line 19. After "of" insert -- a --

Col. 1, line 46. Change "by turns" to -- in turn --

Col. 2, line 13. Change "when" to -- wherein --

Col. 5, line 61. Change "Y" to -- y --

Col. 8, line 1. Delete "the" and after "of" (first occurrence) insert --the--

Signed and Sealed this

Twelfth Day of July, 1994

Attest:

BRUCE LEHMAN

Attesting Officer          Commissioner of Patents and Trademarks